United States Patent
Pujic et al.

(10) Patent No.: US 10,333,869 B2
(45) Date of Patent: Jun. 25, 2019

(54) TELEPHONY ENDPOINT PRESENCE AND INSTANT MESSAGING DATA-PACKET MANAGEMENT

(71) Applicant: Avaya Inc., Santa Clara, CA (US)

(72) Inventors: Milos Pujic, Belleville (CA); Bryn Rahm, Ottawa (CA)

(73) Assignee: Avaya Inc., Santa Clara, CA (US)

(*) Notice: Subject to any disclaimer, the term of this patent is extended or adjusted under 35 U.S.C. 154(b) by 643 days.

(21) Appl. No.: 14/755,805

(22) Filed: Jun. 30, 2015

(65) Prior Publication Data

US 2017/0005956 A1 Jan. 5, 2017

(51) Int. Cl.
*G06F 15/16* (2006.01)
*H04L 12/58* (2006.01)

(52) U.S. Cl.
CPC .................. *H04L 51/043* (2013.01)

(58) Field of Classification Search
CPC ..................................... H04L 51/043
USPC .......................................... 709/206
See application file for complete search history.

(56) References Cited

U.S. PATENT DOCUMENTS

| | | | | |
|---|---|---|---|---|
| 2010/0174789 A1* | 7/2010 | Pena | ................ | G06F 9/54 |
| | | | | 709/206 |
| 2011/0026517 A1* | 2/2011 | Capuozzo | ......... | H04M 3/42323 |
| | | | | 370/352 |
| 2012/0136946 A1* | 5/2012 | Cui | ................ | H04L 51/043 |
| | | | | 709/206 |
| 2013/0010333 A1 | 1/2013 | Anand et al. | | |
| 2013/0343225 A1* | 12/2013 | Richards | ............. | H04L 12/6418 |
| | | | | 370/254 |
| 2016/0057616 A1* | 2/2016 | Ljung | ................ | H04L 51/20 |
| | | | | 370/254 |

OTHER PUBLICATIONS

Cisco Presence and IM http://www.cisco.com/c/en/us/td/docs/voice_ip_comm/cucm/srnd/9x/uc9x/presence.html, 42 pages.

* cited by examiner

*Primary Examiner* — Alan S Chou
(74) *Attorney, Agent, or Firm* — Sheridan Ross P.C.

(57) ABSTRACT

Federated computing architectures allow for the interoperability of components and facilitates the exchange of data between varying systems and components. Endpoints, such as those utilizing Extensible Messaging and Presence Protocol (XMPP) assume the same XMPP stream is used for both messaging and presence. Such systems are unable to accommodate a representational state transfer ("REST") or, in other words, be "RESTful," where the messaging server and presence server are distinct servers and may be on different domains. Provided here are systems described to split the protocols and enable an endpoint to appear to communicate with a single server while a protocol splitter routes and receives messages from distinct servers handling messaging and presence separately.

19 Claims, 6 Drawing Sheets

TELEPHONY ENDPOINT PRESENCE AND INSTANT MESSAGING DATA-PACKET MANAGEMENT

FIELD OF THE DISCLOSURE

The present disclosure is generally directed toward communication system endpoints and more particularly to data-packet routing and processing.

BACKGROUND

Presence is an indication of the availability of an individual at a point in time, and presently refers to the visibility of a person on a shared communication network.

A federated architecture allows interoperability and information sharing between information technology systems and applications. Presence services (PS), such as provided by Avaya Aura® Presence Services, provide an aggregated presence for a user. PS supports protocols, such as Session Initiation Protocol/Session Initiation Protocol for Instant Messaging and Presence Leveraging Extensions (SIP/SIMPLE) and Extensible Messaging and Presence Protocol (XMPP). PS uses server-to-server updates to collect and publish presence information, and may federate with third-party applications.

XMPP is utilized for both instant messaging (IM) and presence services (PS). A typical XMPP endpoint assumes that the same XMPP stream is used for both presence and messaging and utilizes the same server for both PS and IM.

SUMMARY

It is with respect to the above issues and other problems that the embodiments presented herein were contemplated.

A user-transparent protocol splitting mechanism is provided operable to check a message when it comes in, determine whether it will be handled by a presence server or an instant messaging server, engage the appropriate server, and seamlessly handle the relationship of the PS/IM for end-users.

Developments in computer applications, such as IM, utilize Representational State Transfer (REST) based architecture comprising a distinct IM server, which is separate from the presence server. This separation presents challenges as to how to tie IM and presence implementations together in a way that will continue to be transparent to users. In one embodiment, a backward compatible architecture is provided, utilizing a protocol splitter, to enable existing XMPP endpoints utilizing XMPP for both PS and IM to be unaware of PS and IM servers being different servers or different domains within a federation. The single XMPP stream, coming from an XMPP endpoint, is then made available for processing to both the presence server and the IM server.

In another embodiment of the present disclosure, a protocol splitter is provided to check a message received from an XMPP endpoint, determine whether the message is relevant to PS or IM and, consequently, whether it will be handled by a PS server or a messaging server (e.g., an Avaya Multimedia Messaging Server (AMM)), engage the appropriate server, and provide the mechanism to handle the relationship of the PS/IM that preserves transparency to the endpoint. The protocol splitter may be implemented on XMPP endpoints, such as the Avaya model H.323, which are configured to use XMPP for both presence and IM.

Domain-based federation can provide an exchange between the old endpoints and the new architecture. Without implementing certain embodiments disclosed herein, a legacy endpoint would see the IM in different domains (e.g., other ".com" systems). If all XMPP messages were simply redirected to the messaging server for handling, the presence information would be dropped.

In one embodiment, a user can be administered with one of two models for its XMPP endpoints to engage the appropriate server(s). For example:
i. Both presence and IM are delivered by the PS server; and
ii. The presence service is delivered by the PS server, while the IM service is delivered by the messaging server, wherein the XMPP protocol splitter is employed.

This user-administration model facilitates a flexible per-user logic that can be applied to XMPP messages relevant to IM when determining which server needs to process the presence messages and the communication (e.g., "IM") messages. The XMPP endpoints open an XMPP connection with the XMPP protocol splitter, which can be delivered or implemented as a PS software component or module.

XMPP messages relevant to IM, and of no relevance to presence, can be relatively identified, such as by the message XMPP stanza; messages that include an "<x/>" XML element from the multi-user chat (e.g., "http://jabber.org/protocol/muc" namespace) or any namespace that starts with "http://jabber.org/protocol/muc#," such as, "<x xmlns=http://jabber.org/protocol/muc#user>," and subsets of "info-query," IQ XMPP Stanzas, or IM address.

In one embodiment, a system is disclosed, comprising: a first server configured to communicate with a second server and an endpoint; the first server providing presence services; the first server, upon receiving a message from the endpoint and determining the message comprises presence content, processes the message as a presence service message; and the first server, upon receiving a message from the endpoint and determining the message comprises messaging content, forwards the message to the second server.

In another embodiment, an endpoint is disclosed, comprising: a messaging module configured to generate messaging messages; a presence module configured to generate presence messages; a processor; a human-machine interface; and a protocol splitter configured to intercept messages from the messaging module to the presence module and modify at least one of messaging messages from the messaging module and presence messages from the presence module to enable both the messaging module and the presence module to address messages generated therefrom to a common domain.

In another embodiment, a method is disclosed, comprising: opening a connection between an endpoint and a protocol splitter; receiving a message, via the connection, at the protocol splitter from the endpoint is destined for one of a messaging server and a presence server; determining, by the protocol splitter, that the message comprises messaging content; and in response to the determining step, routing the message to the messaging server.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
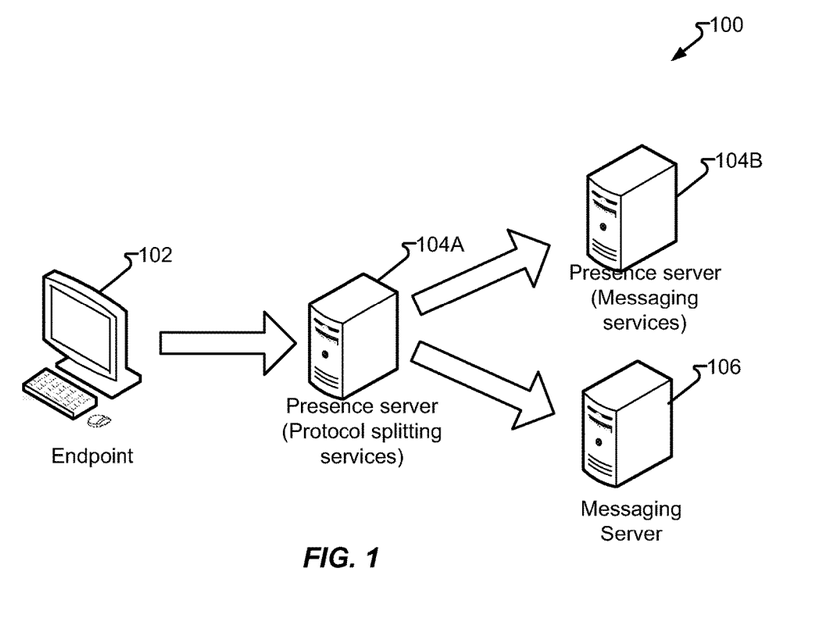
FIG. 1 depicts a first system in accordance with embodiments of the present disclosure.

FIG. 1 depicts system 100 in accordance with embodiments of the present disclosure. In one embodiment, endpoint 102 sends a message to presence server 104, presence server 104 serving as protocol splitter and herein presence server 104A. Presence server 104A determines whether the message received from endpoint 102 is a messaging message or a presence message. The presence server 104A determines the message is a presence message. The message is processed as a presence message by presence server 104B. Presence servers 104A and 104B may be distinct components or combined as a single unit, such as a single server 104. Messaging server 106 is distinct from presence server 104A and provides messaging services for endpoint 102.

Presence server 104A and messaging server 106 may be components of the Federation and comprise differing domain. As a benefit of system 100, endpoint 102 is oblivious to presence server 104A and messaging server 106 not being the same server or otherwise operable to process both presence messages and messaging messages.

Endpoint 102 may comprise one or more communication devices. For example, endpoint 102 may be a soft phone running on a computer, cell phone, laptop, tablet, and/or other device or devices operable to communicate with at least one other component for messaging and presence.

Endpoint 102 may be further configured to communicate via protocols supporting presence and/or messaging, such as SIP/SIMPLE and XMPP. As a benefit of certain embodiments disclosed herein, endpoint 102 may be compliant with the REST or more conventional architectures without requiring modification of endpoint 102 or how endpoint 102 messages.

In one embodiment, system 100 illustrates presence servers 104A and 104B as two logically distinct components, which may be further embodied as physically distinct components. In another embodiment, presence servers 104A and 104B are embodied as a single server, which may be a dedicated device or shared with other functionality. The unified presence server 104 then provides protocol splitting services and presence messaging services.

Although certain advantages may be realized by having presence server 104 and messaging server 106 distinct, in another embodiment, presence server 104 and messaging server 106 are unified. As a benefit, endpoint 102 does not require modification to be operational within a federation, and presence server 104 and messaging server 106 are distinct, and within non-federation environments or environments wherein messaging server 106 and presence server 104 are provided by a unified server.

In another embodiment, endpoint 102 may register with presence server 104A or another server providing protocol splitting services. Endpoint 102 then opens a communication channel with presence server 104A for providing presence messages and messaging messages to a single entity without requiring modification of endpoint 102.

Figure 2:
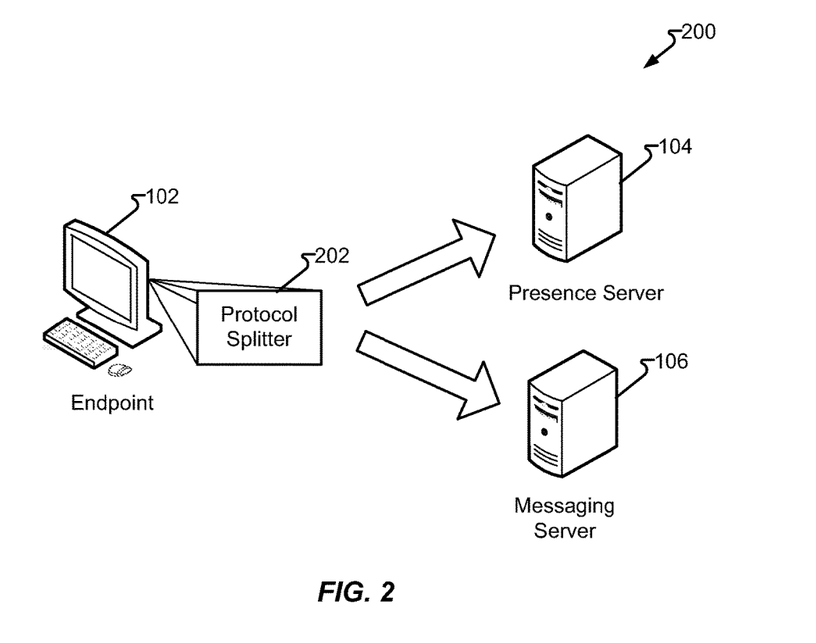
FIG. 2 depicts a second system in accordance with embodiments of the present disclosure.

FIG. 2 depicts system 200 in accordance with embodiments of the present disclosure. In one embodiment, endpoint 102 comprises protocol splitter module 202. Protocol splitter 202 may be a hardware component, software component, and/or a combination thereof (e.g., firmware). Protocol splitter module 202 may then intercept messages previously designated for a single server processing both presence and messaging messages. Protocol splitter module 202 may then modify or otherwise route the message to an appropriate destination associated with the message being one of a presence message or a messaging message.

Protocol splitter 202, after determining the message comprises a presence message, may then route the message to presence server 104. Similarly, protocol splitter 202, after determining the message comprises a messaging message, may then route the message to messaging server 106. As a benefit, endpoint 102 may then operate with the assumption that presence server 104 and messaging server 106 are a single server processing both presence messages and messaging messages. The only modification therefore required of endpoint 102 is the application of protocol splitter 202.

In another embodiment, protocol splitter 202 may be an application or portion thereof (e.g., patch, update, application programming interface, etc.) installed as an update or replacement to a communication application executed by endpoint 102.

Endpoint 102, components thereof, may then register or omit registration to facilitate the opening of the communication channel with protocol splitter 202. Protocol splitter 202 directly or via another component, such as a network interface, may open a channel with one or more of presence server 104 and messaging server 106. Presence server 104 and messaging server 106 may then communicate with protocol splitter module 202 and therefore endpoint 102 without regard to whether presence server 104 and messaging server 106 are within the same federation.

Figure 3A:
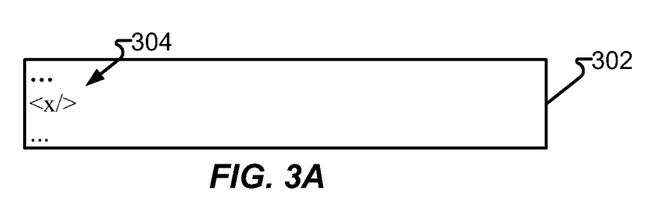
FIG. 3A depicts a first message content indicator in accordance with embodiments of the present disclosure.

FIG. 3A depicts message 302 in accordance with embodiments of the present disclosure. In one embodiment, message 302 comprises an XMPP identifier, such as the "x/" tag 304. Protocol splitter 202 or presence server 104A may determine the presence of the tag within message 302 and further identify it as a messaging message for routing to messaging server 106. If tag 304 is absent, as well as other indicators associated with the messaging message, protocol splitter 202 or presence server 104A may then route the message to presence server 104, handling messaging and protocol splitting services, or presence server 104B, respectively.

Figure 3B:
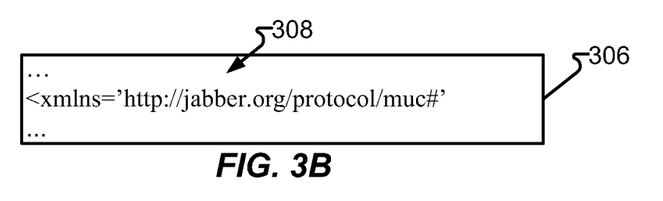
FIG. 3B depicts a second message content indicator in accordance with embodiments of the present disclosure.

FIG. 3B depicts message 306 content indicator in accordance with embodiments of the present disclosure. In one embodiment, message 306 comprises an XML element from the Presence XMPP stanza, such as the "http://jabber.org/protocol/muc" namespace tag 308. Protocol splitter 202 or presence server 104A may determine the presence of the tag within message 306 and further identify it as a messaging message for routing to messaging server 106. If tag 308 is absent, as well as other indicators associated with the messaging message, protocol splitter 202, or presence server 104A, may then route the message to presence server 104, handling messaging and protocol splitting services, or presence server 104B, respectively.

Figure 3C:
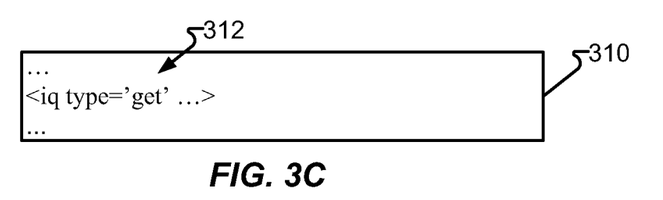
FIG. 3C depicts a third message content indicator in accordance with embodiments of the present disclosure.
Figure 4:
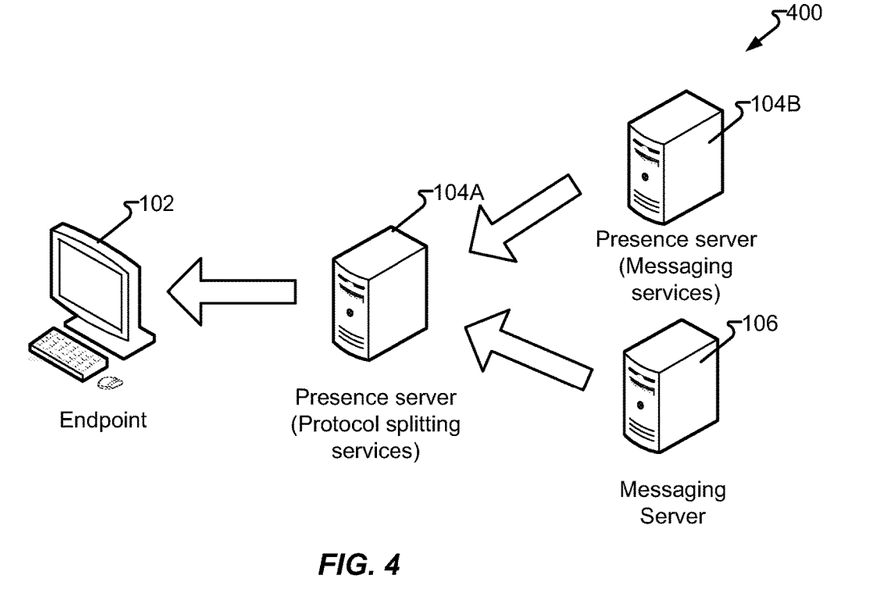
FIG. 4 depicts a third system in accordance with embodiments of the present disclosure.

FIG. 3C depicts message 310 content indicator in accordance with embodiments of the present disclosure. In one embodiment, message 310 comprises an XML element from the XMPP IQ stanza tag 312 or other element having an IQ stanza tag therein (e.g., "set," "get," "result," or "error" type identifiers). Protocol splitter 202 or presence server 104A may determine the presence of the tag within message 310 and further identify it as a messaging message for routing to messaging server 106. If tag 312 is absent, as well as other indicators associated with the messaging message, protocol splitter 202 or presence server 104A may then route the message to presence server 104, handling messaging and protocol splitting services, or presence server 104B, respectively FIG. 4 depicts system 400 in accordance with embodiments of the present disclosure. In one embodiment, endpoint 102 is receiving a message from presence server 104A providing protocol splitting services. Presence server 104 may be logically segregated into protocol splitting services 104A and presence server 104B utilized for messaging. Alternatively, presence server 104A and 104B may be combined into a single logical and optionally physical component presence server 104. Messages received by presence server 104A are then routed to endpoint 102.

Prior to the receiving of the message, endpoint 102 previously opened a stream for communication with presence server 104A. Accordingly, presence server 104A is then in communication with endpoint 102 and operable to forward messages received from presence server 104B and messaging server 106.

Figure 5:
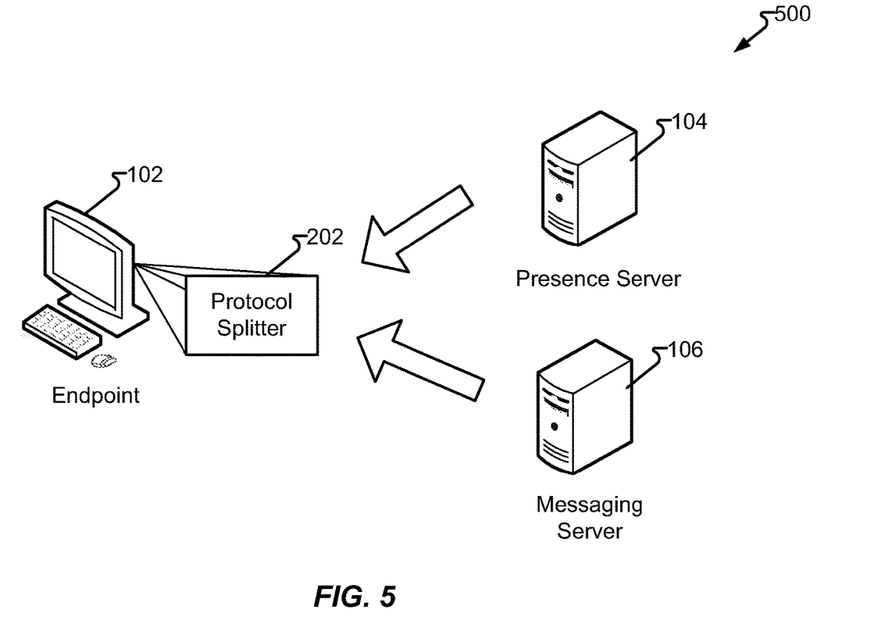
FIG. 5 depicts a fourth system in accordance with embodiments of the present disclosure.

FIG. 5 depicts system 500 in accordance with embodiments of the present disclosure. In one embodiment, protocol splitter 202 is a component of endpoint 102. As was more fully described with respect to FIG. 2, protocol splitter module 202 may be hardware, software, and/or firmware operable by endpoint 102.

Presence server 104 and messaging server 106 may provide messages, presence and messaging, respectively, to protocol splitter 202. Protocol splitter 202 may then provide the message to other components of endpoint 102 without revealing or requiring knowledge of the domains associated with ones of presence server 104 and messaging server 106.

Figure 6:
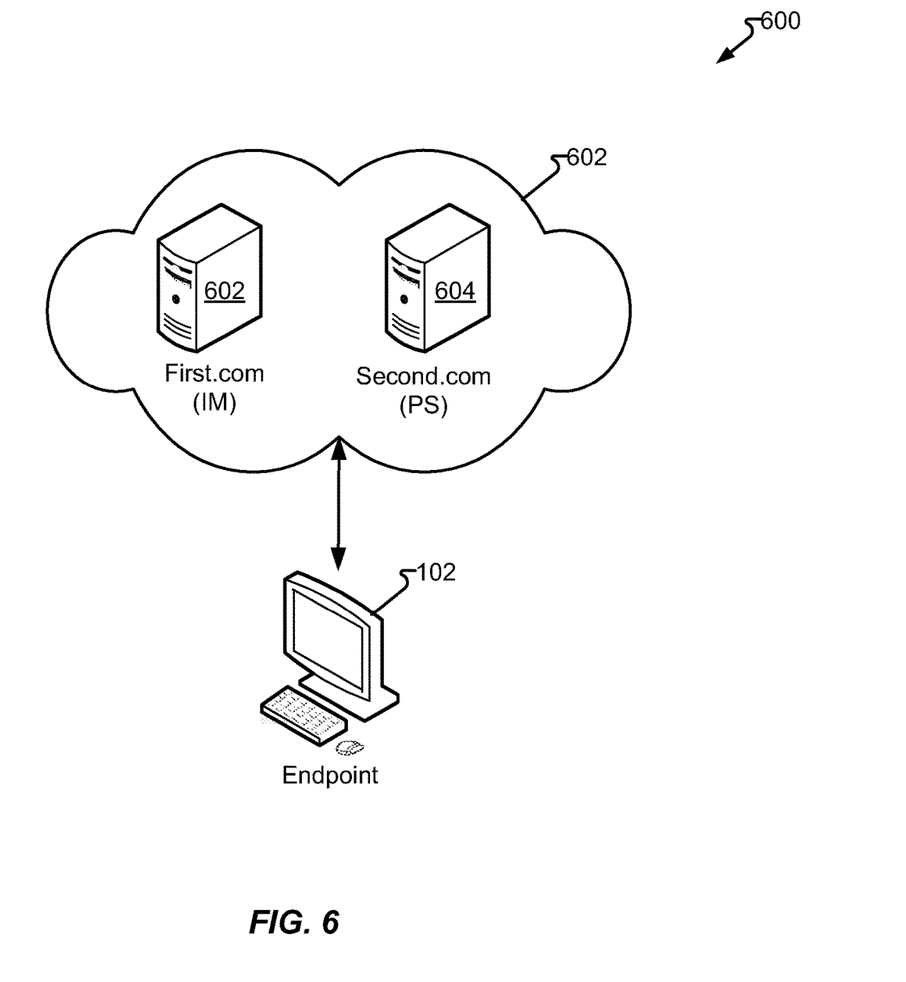
FIG. 6 depicts a fifth system in accordance with embodiments of the present disclosure.

FIG. 6 depicts system 600 in accordance with embodiments of the present disclosure. In one embodiment, endpoint 102 is in communication with and/or a component of Federation 602. Federation 602 comprises a plurality of servers supporting REST-based messaging.

Endpoint 102, with the benefit of the protocol splitter, such as vertical splitter module 202, may then communicate with server 602 and server 604 without regard to the domain differences thereof (e.g., "first.com" and "second.com"). For example, one of server 602 and server 604 may operate as presence server 104A and the other of server 602 and server 604 may operate as messaging server 106.

Figure 7:
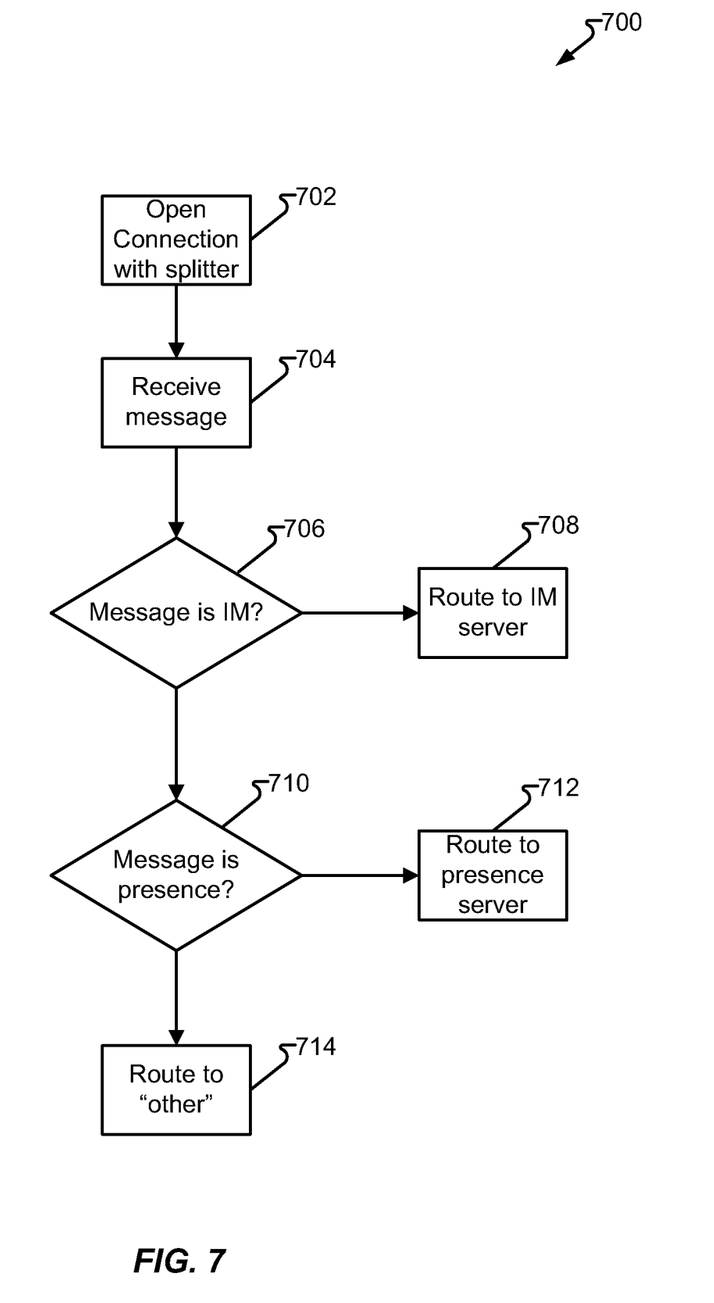
FIG. 7 depicts a first process in accordance with embodiments of the present disclosure.

FIG. 7 depicts process 700 in accordance with embodiments of the present disclosure. In one embodiment, process 700 begins with step 702 wherein the connection is opened with a protocol splitter, such as endpoint 102 opening a connection with presence server 104A or protocol splitter module 202. Next, step 704 receives a message, such as a message being received by protocol splitter module 202 from endpoint 102.

Next, step 706 determines if the message is an instant messaging (IM) message or other messaging message, such as at least one of messages 302, 306, 310. If step 706 is determined in the affirmative, step 708 routes the message to a messaging server, such as messaging server 106. If step 706 is determined in the negative, process 700 continues to step 710 wherein the message is determined to be a presence message.

Upon step 710 being determined in the affirmative, processing continues to step 712 wherein the message is routed to a presence server, such as presence server 104B when presence server 104 is segregated into a protocol splitter portion (e.g., presence server 104A) or presence server 104 when presence server 104 is a unified component.

Optionally, upon step 710 being determined in the negative, the message may then be processed by step 714 as an "other" message. For example, a message unrelated to presence or messaging.

Figure 8:
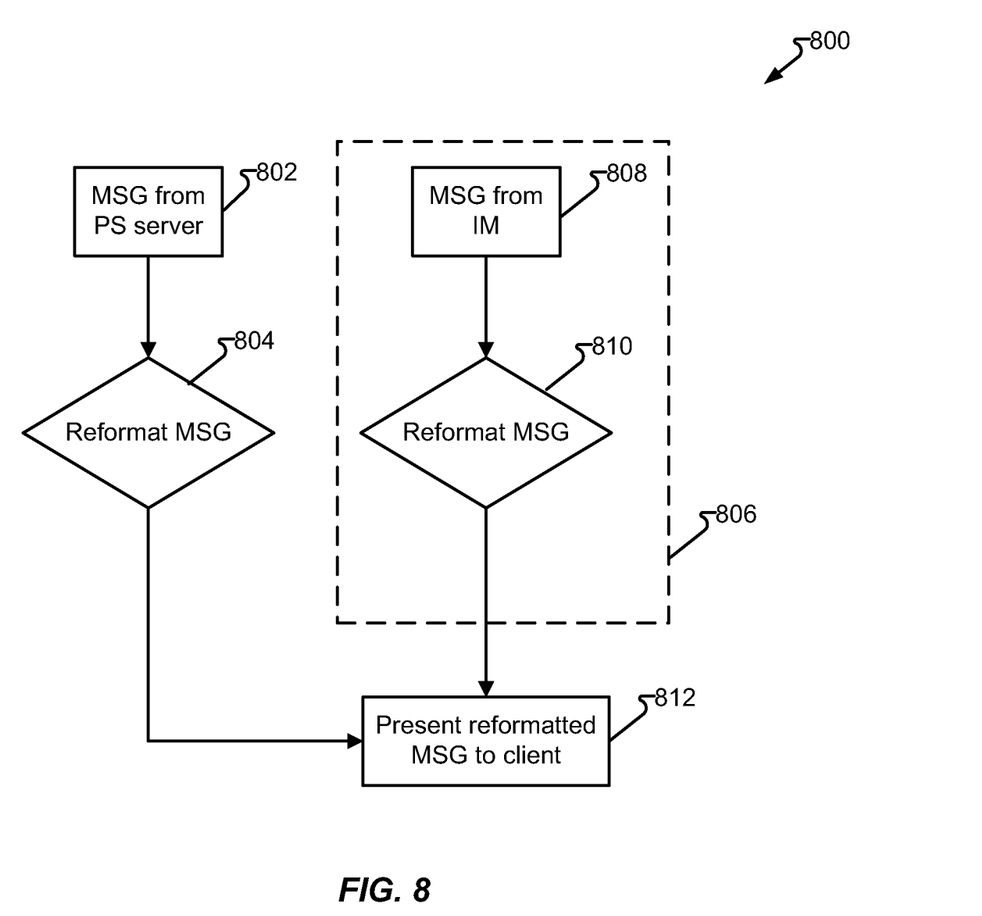
FIG. 8 depicts a second process in accordance with embodiments of the present disclosure.

FIG. 8 depicts process 800 in accordance with embodiments of the present disclosure. In one embodiment, process 800 begins at step 802, whereby a message is received from a presence server, such as, a message received from presence server 104 by protocol splitter module 202. Next, step 804 determines if the message requires reformatting. If step 804 is determined in the affirmative, processing continues to step 812 wherein the message is reformatted for presentation to the client, such as endpoint 102. If step 804 is determined in the negative, the message as-is may then be presented to the client, such as endpoint 102.

Optionally, logic block 804 may be included within process 800. Accordingly, step 808 receives a message comprising messaging content, such as from messaging server 106. Step 810 then determines if the incoming message requires reformatting and, if so, executes step 812 thereby causing the reported matted message to be presented to the client, such as endpoint 102.

As a benefit of the steps provided by process 800, an endpoint, such as endpoint 102, may be presented with messages comprising both presence messages and messaging messages with the apparent origination, to endpoint 102, of the same domain.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
a first server that communicates with a second server and an endpoint;
the first server providing presence services;

the first server, upon receiving a message from the endpoint and determining that the message comprises presence content, processes the message as a presence service message; and the first server, upon receiving a message from the endpoint and determining that the message comprises messaging content, forwards the message to the second server; and wherein the first server causes the domain of the first server and the domain of the second server, when different from the domain of the first server, to appear to the endpoint as the same domain.

2. The system of claim 1, wherein the first server determines the message comprises presence information by determining the message comes from the endpoint comprising an Extensible Messaging and Presence Protocol (XMPP) enabled endpoint.

3. The system of claim 1, wherein the first server modifies messages addressed to the endpoint from at least one of the first server and the second server to cause the endpoint to see messages from the first server and the second server as originating from the same domain.

4. The system of claim 1, wherein the second server processes the message forwarded from the first server as a messaging message and not as a presence message.

5. The system of claim 1, wherein the endpoint has registered for communications with the first server.

6. An endpoint, comprising:
   a protocol splitter;
   a processor; and
   a human-machine interface; and
   wherein the processor:
      generates messaging messages to generate messages addressed to a first domain; and
      generates presence messages addressed to a second domain; and
   wherein the protocol splitter intercepts messaging messages and modifies at least one of messaging messages and presence messages to be addressed to a common domain.

7. The endpoint of claim 6, wherein the protocol splitter registers with a presence server for communicating messages therewith and further comprising at least the generated presence messages.

8. The endpoint of claim 6, wherein the protocol splitter registers with a presence server for communicating messages therewith and further comprising at least the generated messaging messages.

9. The endpoint of claim 6, further comprising an Extensible Messaging and Presence Protocol (XMPP) enabled endpoint.

10. The endpoint of claim 9, wherein the processor generates the messaging messages compliant with XMPP.

11. The endpoint of claim 6, wherein the protocol splitter further receives messages from a presence server and a messaging server having different domains and modifying the received messages to the messaging module and the presence module to appear to originate from the same domain.

12. The endpoint of claim 11, wherein protocol splitter forwards the messages having the appearance of originating from the same domain to the processor for processing as messaging messages, when the message is determined to comprise a messaging message, and to the processor for processing as presence messages, when the message is determined to comprise a presence message.

13. The endpoint of claim 12, wherein the protocol splitter further forwards messages compliant with XMPP to the processor for processing as a messaging message.

14. A method, comprising:
   opening a connection between an endpoint and a protocol splitter;
   receiving a message, via the connection, at the protocol splitter from the endpoint that is destined for one of a messaging server and a presence server, wherein the messaging server has an address comprising a first domain and the presence server has an address comprising a second domain and wherein messages from the endpoint are addressed to a single domain of the first domain and the second domain;
   determining, by the protocol splitter, that the message comprises messaging content; and
   in response to the determining step, routing the message to the messaging server.

15. The method of claim 14, wherein the message from the endpoint is destined for the same domain as the single domain.

16. The method of claim 15, wherein the protocol splitter addresses the message for forwarding to one of the messaging servers on the first domain and the presence server on the second domain.

17. The method of claim 16, wherein the step of determining further comprises determining that the message is compliant with Extensible Messaging and Presence Protocol (XMPP) and, upon the determining step being determined as true, routing the message to the messaging server.

18. The method of claim 17, wherein the step of determining further comprises determining the message comprises an XMPP stanza.

19. The method of claim 18, wherein the step of determining further comprises determining the message comprises an info-query (IQ) XMPP stanza.

* * * * *